E. H. HUTCHESON.
WINDSHIELD AWNING.
APPLICATION FILED JULY 2, 1921.
1,423,116.
Patented July 18, 1922.
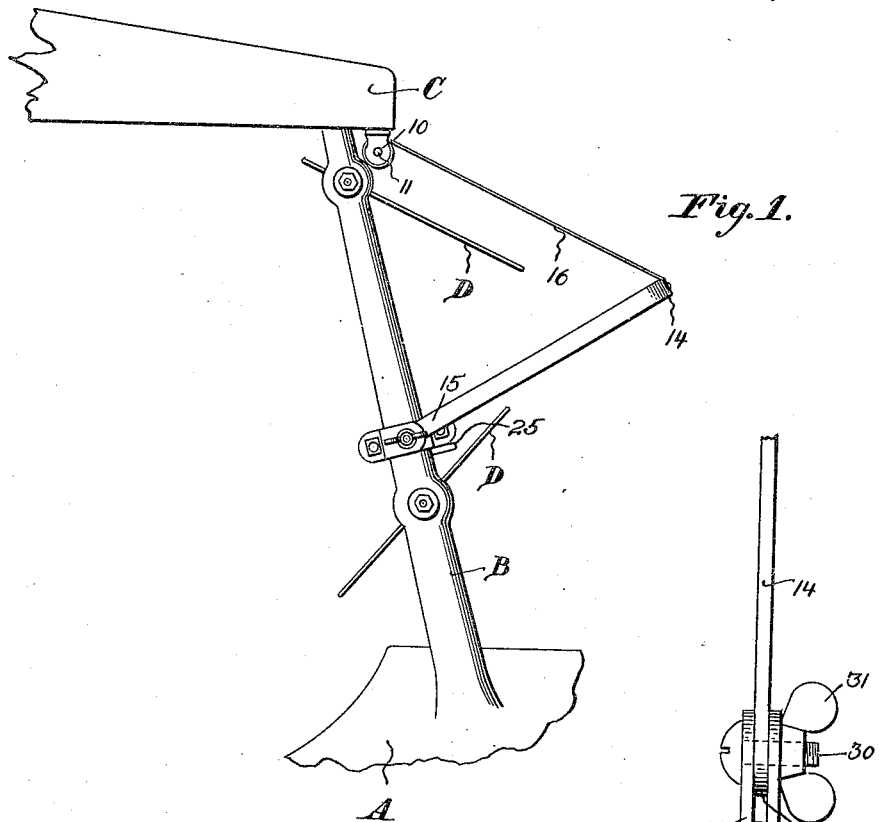
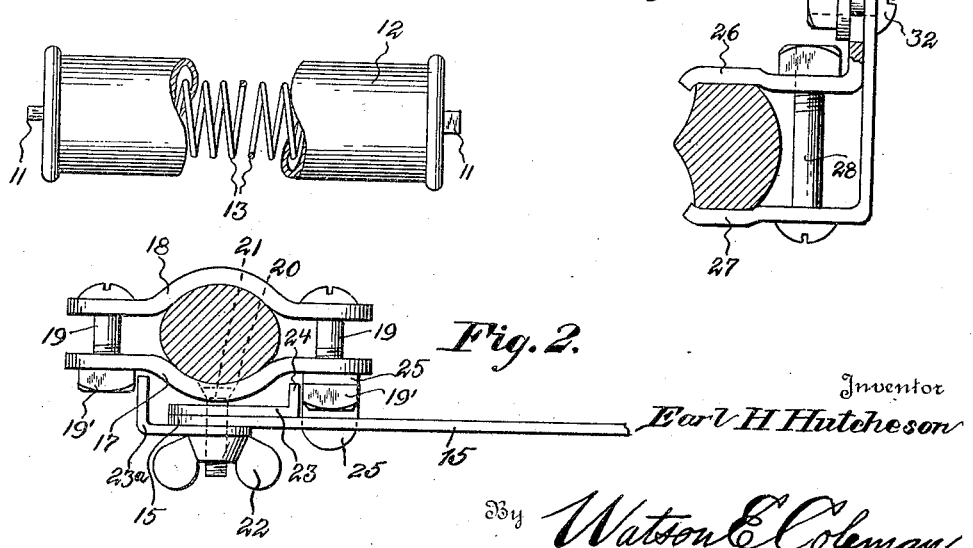
Inventor
Earl H Hutcheson
By Watson E. Coleman
Attorney

UNITED STATES PATENT OFFICE.

EARL H. HUTCHESON, OF AUGUSTA, GEORGIA.

WINDSHIELD AWNING.

1,423,116. Specification of Letters Patent. Patented July 18, 1922.

Application filed July 2, 1921. Serial No. 482,115.

*To all whom it may concern:*

Be it known that I, EARL H. HUTCHESON, a citizen of the United States, residing at Augusta, in the county of Richmond and State of Georgia, have invented certain new and useful Improvements in Windshield Awnings, of which the following is a specification, reference being had to the accompanying drawings.

This invention relates to automobiles, and particularly to the windshields thereof.

The general object of my invention is the provision of a curtain mounted upon the front edge of the top of the automobile and adapted to be drawn downward and forward so as to prevent the sun from blinding or inconveniencing the other occupants of the car.

A further object is to provide a device of this character wherein the curtain is normally rolled up by means of a spring roller attached to the forward end of the top of the automobile, the lower end of the curtain being connected to struts or braces pivotally engaged with the windshield frame, these braces being provided with means whereby they may be clamped in adjusted position to hold the curtain pulled out or lowered to any degree desired.

And a further object is to provide a device of this character which is in the nature of an attachment and which may be readily applied to practically all makes of automobiles.

Other objects will appear in the course of the following description.

My invention is illustrated in the accompanying drawings, wherein:—

Figure 1 is a side elevation of a windshield and top of an automobile showing my curtain applied thereto;

Figure 2 is a cross sectional view through the windshield post showing a fragmentary top plan view of one form of clamp;

Figure 3 is a like view to Figure 2, but showing another form of clamp;

Figure 4 is a fragmentary elevation of the roller upon which the curtain is wound, the roller being partly broken away;

Referring to these drawings, A designates the body of an automobile and B the windshield frame thereof, C designating the top. The windshield frame carries the usual windshields D, these windshield sections being pivotally mounted in the usual manner upon the frame B of the windshield.

My device includes brackets, designated 10, and having the usual form of the brackets supporting spring-actuated shade rollers, these brackets being attached to the under face of the forward bow or other frame of the top and being perforated for engagement with the gudgeons 11 of a roller 12, this roller having within it a coiled torsion spring 13 engaged with one of said gudgeons in the usual manner so that the spring will resist rotary movement of the roller in one direction and will urge the roller in the opposite direction.

Disposed upon the opposite frames B or posts of the windshield are clamping members, and pivotally mounted upon each clamping member by means which will be hereafter described is an approximately U-shaped rod 14 having rearwardly extending arms 15 which are perforated adjacent their rear ends. Attached to the cross bar of this rod 14 and mounted at its other end upon the roller 12 is a curtain 16 of any suitable material. Means are provided, as will be hereafter described, for holding the member 14 in a plurality of adjusted positions with relation to the posts of frame members B.

I have illustrated in Figure 2 a clamp which is adapted to be used with certain forms of windshields and which may be readily applied thereto comprising two confronting, outwardly bowed clamping members 17 and 18, these clamping members being outwardly bowed at their middles and being connected at their ends by clamping bolts 19 having the usual nuts 19'. The member 17 at its end is formed with an aperture 20 which is countersunk upon the inside face of the member for the reception of the tapered head of a bolt 21 having thereon a wing nut 22.

Disposed between each arm 15 and the corresponding clamping member 18 is a nut lock 23 which is perforated for the passage of the bolt 21 and is angularly bent to form a flange 24, this flange engaging against one of the nuts 19' and the nut lock acting to prevent the rotation of the nut 19'. A second nut lock 23ª is perforated for the passage of the bolt 21 and is angularly bent to engage against the other nut 19'. Disposed upon that bolt nearest the cross bar 15 is a washer 25 which extends down behind the nut of this bolt and forward beneath said nut and forms a stop limiting the downward movement of the curtain supporting rod or bar 14. It is obvious that normally the curtain will be held rolled up on the curtain roller 12, and that if it be desired to lower the curtain and hold it lowered the member 14 may be pulled down to any desired angle and then held in this position by tightening up on the nut 22.

In Figure 3 I show a form of clamp which is particularly adapted to certain types of cars and wherein the clamping members consist of two angular sections 26 and 27, the section 27 having a relatively long arm, the angular ends of these members 26 and 27 being slightly bowed to engage on either side of a windshield post, these clamping members being held clamped on the windshield post by the bolt 28. The longitudinal arm of the member 26 is slotted at 26ª and bears flat against the longitudinal arm of the member 27, and bearing against the outer face of the member 26 is a link-like extension 29 perforated adjacent opposite ends to permit the passage of the bolt 30 having the wing nut 31 and to permit the passage of a bolt 32 which passes through the members 27, 26 and 29. The nut 32, of course, holds the member 29 rigid to the member 26. The nut 30, of course, holds the curtain rod 14 in its angularly adjusted position and the bolt 28 holds the clamping members tightly clamped upon the windshield post. A clamp having the general features of this character is adapted to Cadillac cars, Ford cars, and to enclosed cars.

With regard to the washers 23 and 23ª shown in Figure 2, it may be remarked that the washers are prevented from turning by reason of their engagement with the nuts 19'. At the same time these nuts are held from turning. As the washers are stationary and the arm of the curtain rod operates between these washers, it is an easy matter to tighten the thumb nut with the fingers, tight enough to prevent the curtain from being drawn up accidentally when running over a rough place, which it would be otherwise liable to do.

It will be seen that my manner of connecting the U-shaped member 14 to the frame or side posts of the windshield is very simple, that it permits of an expeditious removal of the parts in case of necessity, and that it permits of quick adjustment and a firm holding of the awning or curtain in its various adjusted positions.

It will be noted that the angular member 26 in Figure 3 is longitudinally slotted, as at 26ª. This permits the adjustment of this bracket section 26ª to suit different thicknesses of windshield frames without affecting in any way the position of the link 29 or the position of the bolt 30 passing through this link and through the arm 14 of the awning rod. This permits the parts 26 and 27 to be adjusted toward and from each other through a relatively wide range.

I claim:—

1. An attachment of the character described comprising a spring actuated roller, brackets rotatably supporting the roller, a curtain mounted upon the roller, a U-shaped member, to the cross bar of which the curtain is attached, the ends of the U-shaped member being perforated, two pairs of windshield clamps adapted to engage the posts of the windshield, each pair of clamps comprising clamping members adapted to embrace the windshield post, a pivot bolt projecting from one of the clamping members, bolts extending through the ends of the clamping members, nuts on the ends of the bolts adjacent the pivot bolt, washers disposed on the pivot bolt and having angular extremities engaging with the respective nuts whereby the washers and nuts are mutually held from rotation, the arms of the U-shaped member being disposed between said washers, and a wing nut on the pivot bolt engaging against one of said washers.

2. An attachment of the character described including opposed clamps, bolts passing through the ends of the clamps and having nuts, a pivot bolt projecting from one of said clamps, an oscillatable member mounted on the pivot bolt, washers disposed on each side of the oscillatable member and through which the pivot bolt passes, and a nut on the pivot bolt bearing against one of said washers, each of said washers being provided with lugs engaging against the first named nuts and holding said nuts from rotation and being held from oscillation by said nuts.

In testimony whereof I hereunto affix my signature.

EARL H. HUTCHESON.